US012723995B2

(12) United States Patent
Neumeister et al.

(10) Patent No.: US 12,723,995 B2
(45) Date of Patent: Sep. 1, 2026

(54) X-RAY MEASURING METHOD AND X-RAY MEASURING DEVICE FOR MEASURING A STRAND

(71) Applicant: CiTEX Holding GmbH, Melle (DE)

(72) Inventors: Arno Neumeister, Porta Westfalica (DE); Christoph Herrmann, Karlsbad (DE)

(73) Assignee: CiTEX Holding GmbH, Melle (DE)

( * ) Notice: Subject to any disclaimer, the term of this patent is extended or adjusted under 35 U.S.C. 154(b) by 336 days.

(21) Appl. No.: 18/532,137

(22) Filed: Dec. 7, 2023

(65) Prior Publication Data

US 2024/0353355 A1 Oct. 24, 2024

(30) Foreign Application Priority Data

Apr. 18, 2023 (DE) ..................... 10 2023 109 662.1

(51) Int. Cl.
*G01N 23/18* (2018.01)
*G01N 23/083* (2018.01)

(52) U.S. Cl.
CPC ........... *G01N 23/18* (2013.01); *G01N 23/083* (2013.01); *G01N 2223/1016* (2013.01); *G01N 2223/3032* (2013.01); *G01N 2223/32* (2013.01); *G01N 2223/401* (2013.01); *G01N 2223/413* (2013.01); *G01N 2223/628* (2013.01); *G01N 2223/646* (2013.01); *G01N 2223/652* (2013.01)

(58) Field of Classification Search
None
See application file for complete search history.

(56) References Cited

U.S. PATENT DOCUMENTS 4,725,963 A 2/1988 Taylor
5,379,237 A * 1/1995 Morgan ............... G01N 23/083 703/2
5,608,660 A * 3/1997 Morgan .................. B21B 37/78 702/155
5,614,720 A * 3/1997 Morgan ................. G01N 23/18 250/358.1
6,377,654 B1 * 4/2002 Willems ............... G01B 15/025 378/54
8,131,107 B2 * 3/2012 Sun ......................... G06T 7/001 382/272
10,697,905 B2 * 6/2020 Featonby ......... G01N 23/20066
11,085,886 B2 * 8/2021 Teleki ..................... G06T 7/174

(Continued)

FOREIGN PATENT DOCUMENTS

CN 111596179 A * 8/2020 ........... G06F 18/241
EP 4450919 A1 * 10/2024 ............. G01N 23/04

(Continued)

OTHER PUBLICATIONS

Edalati Ket al: "The use of radiography for thickness measurement and corrosion monitoring in pipes", International Journal of Pressure Vessels and Piping, Elsevier Science Publishers, Barking, GB, Bd. 83, Nr. 10, Sep. 29, 2006 (Sep. 29, 2006), pp. 736-741, 6 pages.

(Continued)

*Primary Examiner* — Thomas R Artman
(74) *Attorney, Agent, or Firm* — Barnes & Thornburg LLP

(57) ABSTRACT

The present disclosure relates to an X-ray measuring method and an X-ray measuring device for measuring a strand.

29 Claims, 6 Drawing Sheets

(56) References Cited

U.S. PATENT DOCUMENTS

| | | | | |
|---|---|---|---|---|
| 11,668,660 | B2 * | 6/2023 | Nisius | G01N 23/04 378/60 |
| 11,821,850 | B2 * | 11/2023 | Venkatachalam | G01N 23/04 |
| 2009/0279772 | A1 | 11/2009 | Sun | |
| 2018/0100816 | A1 * | 4/2018 | Featonby | G01N 23/18 |
| 2019/0154596 | A1 | 5/2019 | Teleki | |
| 2022/0099598 | A1 * | 3/2022 | Nisius | G01N 23/04 |
| 2022/0099599 | A1 * | 3/2022 | Venkatachalam | G06T 7/001 |
| 2024/0353355 | A1 * | 10/2024 | Neumeister | G01N 23/083 |

FOREIGN PATENT DOCUMENTS

| | | | | |
|---|---|---|---|---|
| JP | 6658315 | | 3/2020 | |
| KR | 20220055175 A | * | 5/2022 | G01N 23/04 |
| RU | 2199109 C2 | | 2/2003 | |

OTHER PUBLICATIONS

Yener Onel: "Radiographic Wall Thickness Measurement of Pipes by a New Tomographic Algorithm", [Online] Nov. 2000 (Nov. 2000),-Apr. 16, 2024 (Apr. 16, 2024), XP93152707, Available from: https://www.ndt.net/article/wcndt00/papers/idn369/idn369.htm, 6 pages.

European Office Action for European Patent App. No. EP23211227.6 dated Jul. 4, 2025, English translation included, 10 pages.

European Search Report for European Patent App. No. EP23211227 dated Apr. 18, 2024, 2 pages.

* cited by examiner 1
2
α
8
Z
A
10
10a
4
3
11
6

1
2
12a
14-1
14-2
14-3
A
10a
WT1
Da
Di
B
12
11
6
10
10a
WT2

1
2
12a
12
14-1
14-2
6
8
A
10a
S2
S3
S2
B
4
3
14-3
11
10

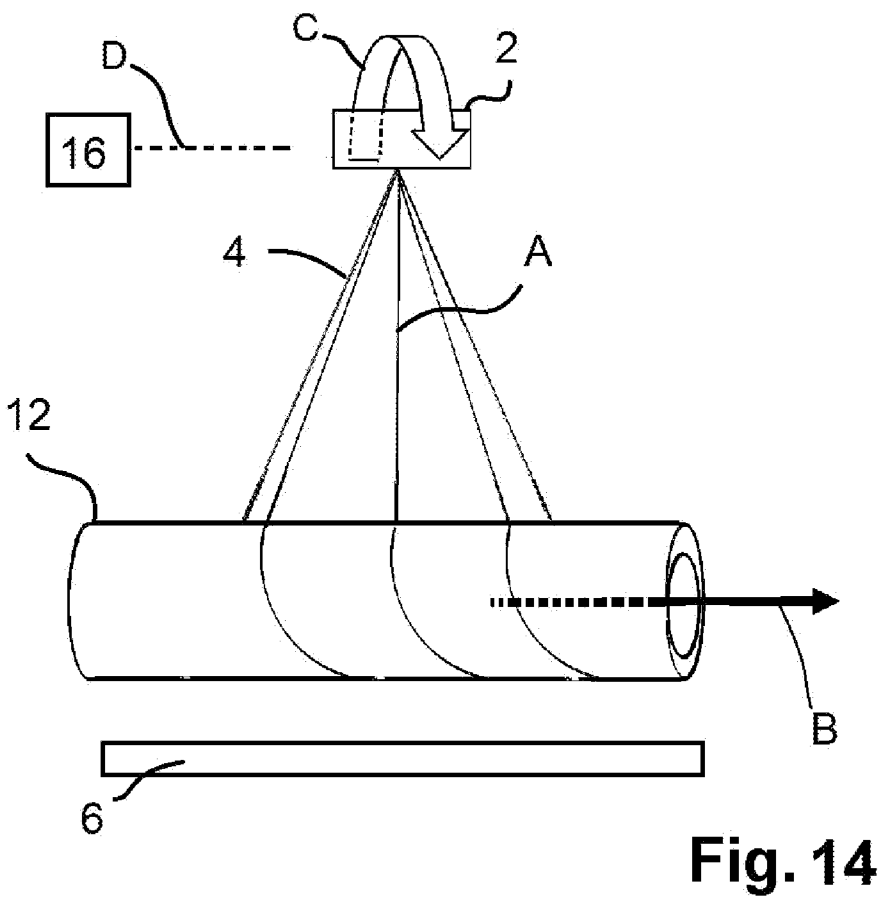
Fig. 14
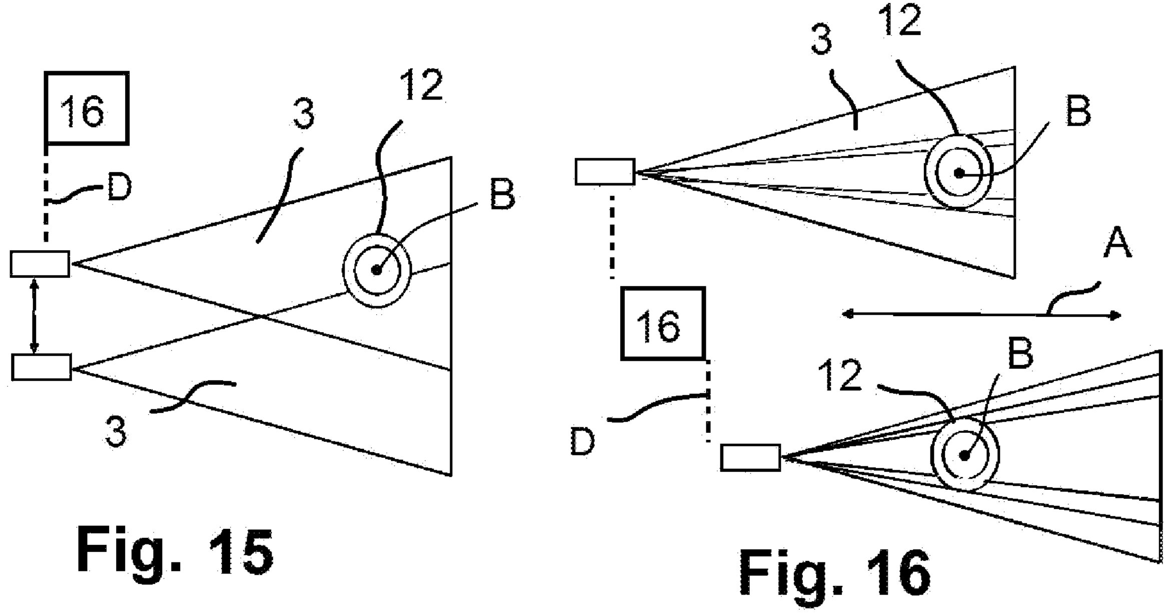
Fig. 15
Fig. 16

X-RAY MEASURING METHOD AND X-RAY MEASURING DEVICE FOR MEASURING A STRAND

PRIORITY CLAIM

This application claims priority to German Patent Application No. DE102023109662.1, filed Apr. 18, 2023, which is expressly incorporated by reference herein.

BACKGROUND

The present disclosure relates to an X-ray measuring method and an X-ray measuring device for measuring a strand, in particular, a pipe or corrugated pipe.

SUMMARY

According to the present disclosure, one objective is to create an X-ray measuring method and an X-ray measuring device allowing for a secure measuring and detection of defects. This objective is provided by an X-ray measuring method and an X-ray measuring.

In illustrative embodiments, upon conveying or, respectively transporting the strand through the measuring space of an X-ray measuring device, transmission curves are collected continuously allowing for the resolution of the measurement in a measuring direction, i.e., the longitudinal length of the detector row which runs perpendicular to the transport direction and to the measuring axis. Hereby, it is provided to compare the transmission curves to determine defects from such comparison. To that end, at least one transmission curve is recorded and stored as reference transmission curve. Multiple transmission curves are picked up by measurements of the strand at different point in time and thereby at different locations of the pipe, and from these a averaged value is formed which serves as reference transmission curve. Thus, by comparing a current transmission curve to the reference transmission curve, faults can be detected and, in particular, even their shape or topology respectively and/or volume can be determined.

In illustrative embodiments, it is possible to continuously measure the strand as measurement object, whereby the currently recorded transmission curves can be continuously compared and checked. Thus, a fault or, respectively, defect in the strand can be recognized and checked directly and immediately to make adjustment to production parameters.

By virtue of the comparison it is possible to also measure the strand in its middle region which is usually not evaluated in comparative measurements due to the low absorption.

By carrying out an averaging across multiple measurements it is possible to generate a transmission curve with high accuracy in which noise is reduced. Thus, a comparison of a current transmission curve with the reference transmission curve is made possible. Hereby, in particular, also specific values of noise of the detector may be recognized and stored in the reference curve so that the current noise of a current transmission curve is not falsely detected as defect. Thus, compared to a theoretic ideal transmission curve the reference transmission curve obtained according to the present disclosure by averaging is advantageous because it takes into consideration the specific noise due to specific characteristics of the X-ray source and the X-ray detector.

Thus, regions with low transmission, i.e., higher absorption, can be recognized as thickenings of material, in the case of extruded pipes, e.g., as burn-off. Correspondingly regions with higher transmission, i.e., lower absorption, can be recognized as material weakening, e.g., shrinkage cavities or material ruptures in the inner layer or outer layer.

The evaluation of the transmission curve first happens in the measuring direction, i.e., the longitudinal extension of the detector row which runs perpendicular to the optical axis and, usually, also perpendicular to the transport direction. Hereby, changes in regions can be detected in successive channels or, respectively, pixels along the measuring direction. Furthermore, successive measurements of the transported strand allow for detecting a longitudinal extension of the defect in the transport direction.

Further measures can improve the accuracy of the determination and classification even further. Arranging multiple measuring axes in the circumferential direction, C around the measuring space allows for a precise localization of a defect in the strand; this allows, e.g., a determination as to whether the defect is present in the material wall of a pipe, on the inner layer or outer layer. Thus, a localization can be carried out, e.g., by trigonometric calculation. Thus, in particular, even faults on the inner layer or shrinkage cavities localized that cannot be recognized from outside.

Furthermore, even overlapping defects can be detected, e.g., burn-off in the region of a material weakening, e.g., a rupture in a layer. Faults of this kind may appear, e.g., when during extrusion the material stays at the hot extruder head for too long and forms a burn-off so that, for one thing, a material weakening will appear in the layer and, for another, the burnt material appears as a local thickening. Defects of this kind may otherwise, when viewing a single transmission curve, potentially be not securely detected because the transmission in total is not influenced to a relevant extent. By virtue of the comparison with the more exact reference transmission curve and optionally the three-dimensional or, respectively, topological determination, even such more complex faults can be securely recognized and quantified.

In illustrative embodiments, the reference transmission curve may be continuously adjusted by including current transmission curves, whereby, in particular, an adaptive comparison of the current transmission curve with the previous transmission curves may be carried out, e.g., taking into consideration changes of the intensities across a longer period of time. Hereby, in particular, migration of the focus point, temperature fluctuations at the detector may be detected, further also influences by the outside temperature, e.g., changes in the outside temperature, also influences by cooling. Furthermore, in particular, wear of the detectors by burning-in of the X-rays may be taken into consideration; such burning-in processes generally limit the lifetime of X-ray detectors. Recognizing the burning-in as long-term drift allows it to be taken into consideration so that the lifetime can be significantly extended.

Thus, it may also be determined, in particular, whether a fault already constitutes an unallowable defect or is still in the realm of admissible tolerance.

In illustrative embodiments, the X-ray source and/or the X-ray detector may be adjusted. Hereby, according to one embodiment, a common adjustment along the measuring axis is provided, i.e., towards the strand and away from the strand, so as to attain centering of the measurement object. Furthermore, a relative adjustment of the X-ray source in relation to the X-ray detector, e.g., an adjustment of the X-ray source with a fixe X-ray detector is possible to create a focusing, e.g., even as autofocus, so that, e.g., the region of the strand covered in the transmission curve is widened, thereby improving the resolution.

In illustrative embodiments, the measuring device or, respectively, X-ray source and X-ray detector may jointly rotate or reverse around the measuring space or, respectively, the measurement object so as to thereby capture the measurement object from different circumferential directions and, e.g., improve the localization of a fault. Thus, faults may be detected in various areas of the transmission curve making it easier to identify them.

The X-ray detector may be configured as a detector row made up of, e.g., three thousand successive measurement channels or pixels respectively; furthermore, the detector may also be configured as a multi-dimensional matrix, e.g., including two or more detector rows. In the alternative and in addition hereto, even multiple measuring axes each made up of an X-ray source and an X-ray detector may be provided one behind another in the transport direction which, therefore, allow for a measuring of the measurement object by means of successive measuring planes in the transport direction. Beside a perpendicular orientation of the measuring axis in relation to the transport direction, angled arrangements are possible, too, to increase absorption and therewith contrast.

The measuring channels or pixels respectively may be configured as hardware, e.g., as CMOS sensors and/or CCD sensors and/or scintillation counters. Hereby, in particular, they may also be configured as time to delay (TDI) CCD sensors, wherein the measurement object or the strand respectively may be guided along the detector, and, preferably, a synchronization of the image capture with the transport velocity may be carried out.

The X-ray detector may be configured, in particular, planar or concavely curved. Hereby, advantageously, the planar measuring plane of the X-ray detector lies perpendicular to the measuring axis of the X-ray source. In the embodiment as a planar X-ray detector, in particular, no exact positioning of the pipe is required, while in the case of concave embodiments, generally, a positioning of the pipe in the focal point or, respectively, center point of the concave embodiment is provided. Thus, even a pipe that is placed not exactly at the intended position will still be well covered.

Thus, advantageously in the method according to the present disclosure, too, a planar X-ray detector is used so that, in particular, the strand must no longer be placed so exactly, and this is, in particular, of advantage also with extrusion products in which the extruded strand usually bends.

In illustrative embodiments, it is possible to determine as faults one or more of the following characteristics in the current transmission curve by means of a comparison with the reference transmission curve:

- a weakening of the material, e.g., imperfection, rupture in a layer, defect or shrinkage cavity, as contiguous areas of measuring channels with a lower intensity, and/or
- a deposit of material, in particular, burn-off, as contiguous areas of measuring channels with a higher intensity. Hereby, in particular, even overlapping faults as an area can be determined in which both weakening of material and material deposits are present.

According to a preferred embodiment it is provided that upon determining the position of the fault it is also determined whether the fault is present in:

- a wall of the strand, e.g., a pipe wall,
- on an exterior surface, e.g., an exterior region of a pipe wall,
- in the inside of the strand, e.g., on an interior wall of the strand, in particular, by measuring in multiple measuring axes.

According to a preferred embodiment it is provided in the method that the one or more X-ray sources are adjusted during the transport of the strand

- in the transport direction, and/or
- in the circumferential direction, C, e.g., rotating and/or reversing, around the axis of transport and/or an axis of symmetry of the measuring space, and/or
- in the direction of their measuring axis.

Hereby, advantageously, it is provided that upon adjustment of the X-ray source in the direction of the measuring axis a focusing, e.g., autofocusing is carried out, to change or adapt the area of the strand covered by the transmission curve.

According to an advantageous embodiment it is provided in the X-ray measuring device according to the present disclosure that it comprises an adjustment means for adjusting the X-ray source and the X-ray detector along a measuring direction.

The X-ray voltage of the X-ray source may lie, in particular, in a range between 15 and 80 KV, preferably 15 and 70 KV, in particular, with current in a range between 0.1 mA and 2 mA.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figures 4, 5, 6:
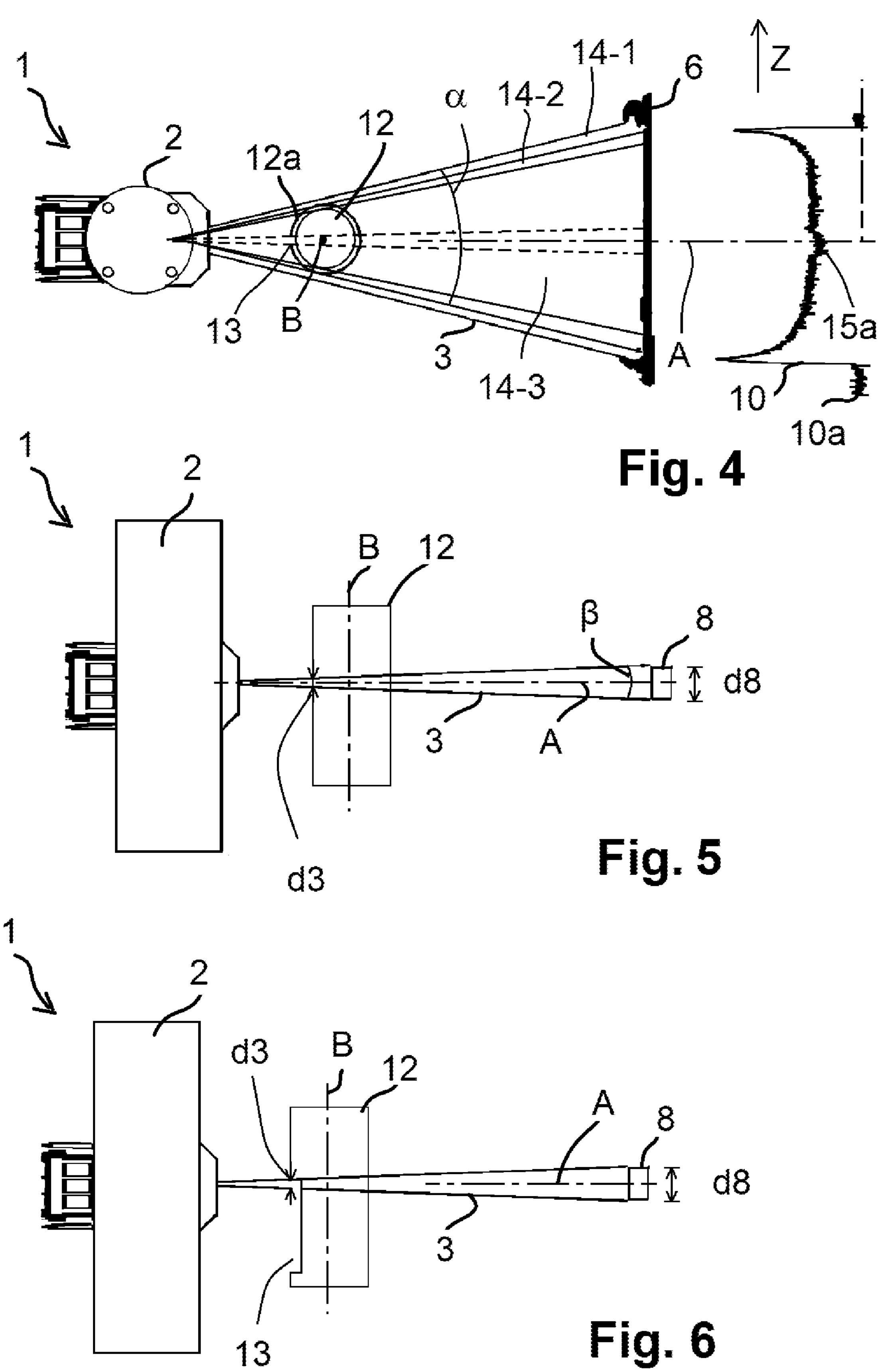
FIG. 4 shows a measurement of a pipe with local weakening of material in a middle area.
FIG. 5 shows a top view on the arrangement of FIG. 3.
FIG. 6 shows a top view on the arrangement of FIG. 4 with a faulty pipe.
Figure 8:
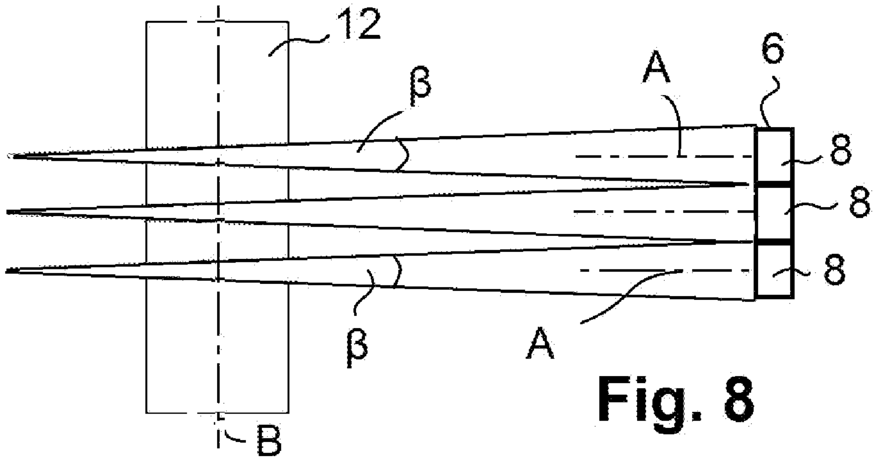
Figure 9:
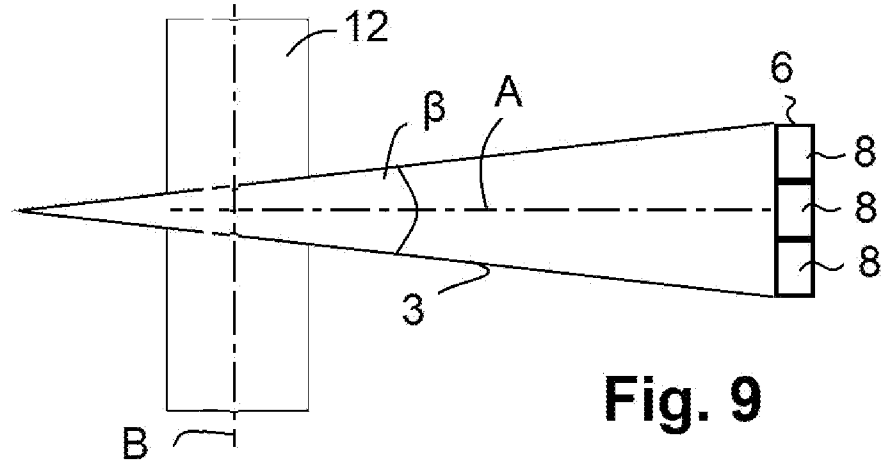
Figure 10:
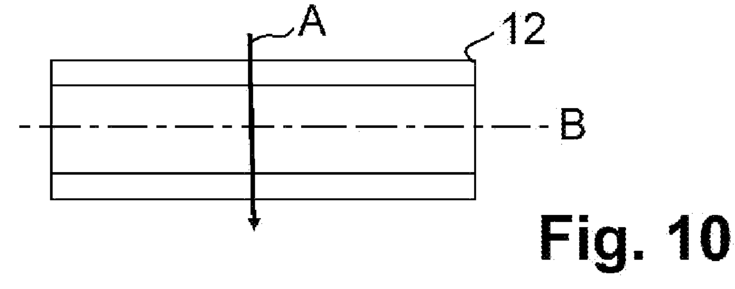
Figure 11:
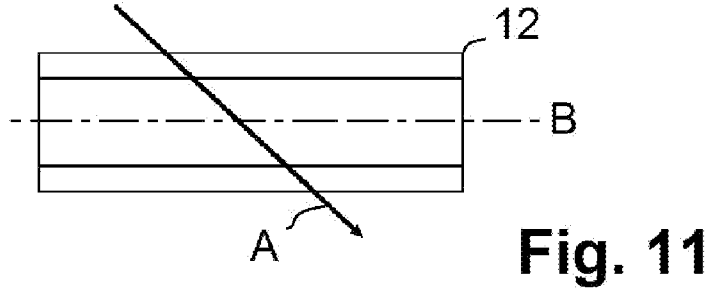
Figures 12, 13:
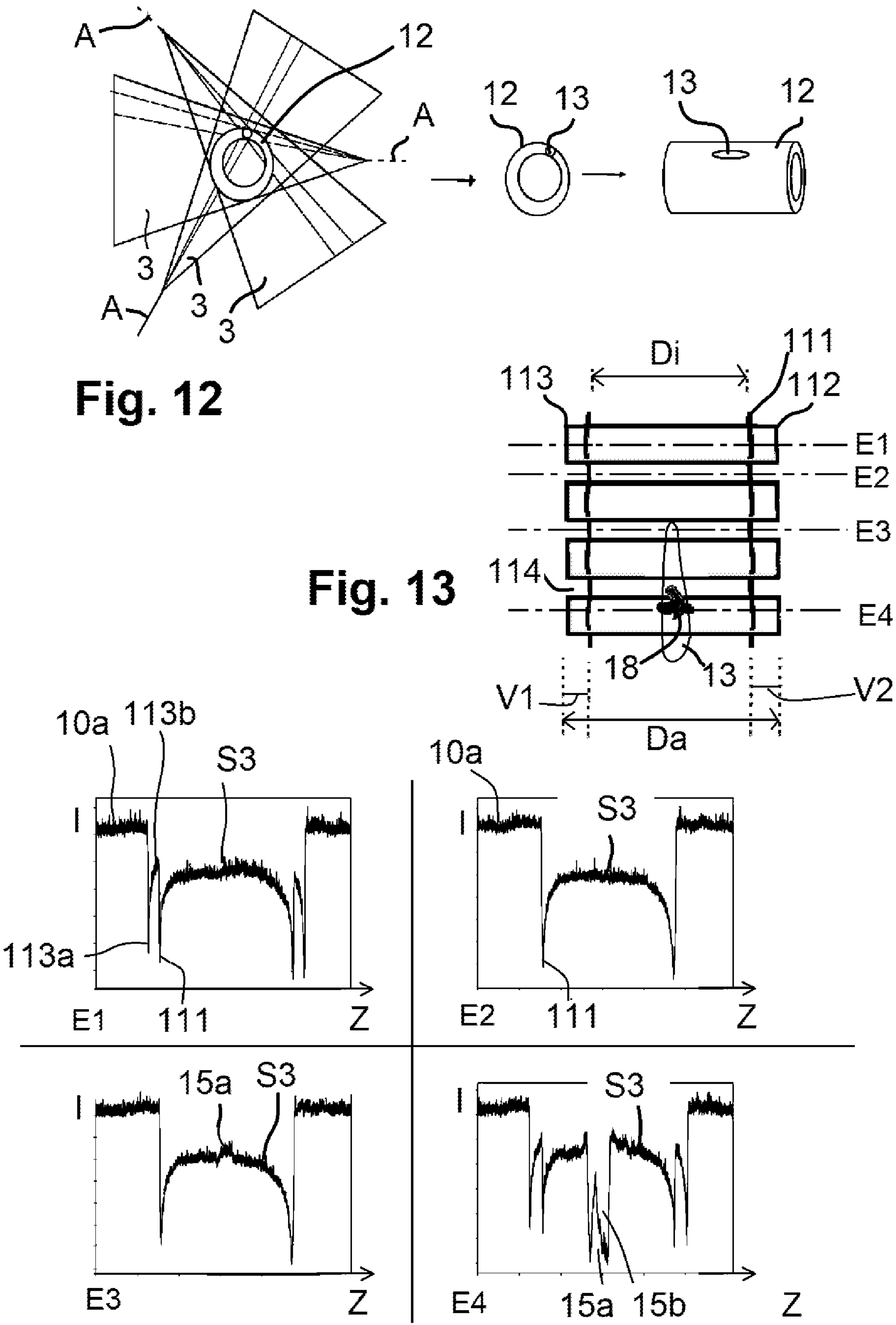

FIG. 7*a* shows transmission curves when measuring a flawless pipe;

Fib. 7*b* shows transmission curves when measuring a pipe with material weakening corresponding to FIGS. 4, 6;

FIG. 7*c* shows transmission curves when measuring a pipe with material deposit in a middle area;

FIG. 7*d* shows transmission curves when measuring a pipe with material deposit in an outer area;

FIG. 8 shows a measuring device including measuring axes in a row;

FIG. 9 shows a measuring device with a wider emission angle in the measuring direction;

FIG. 10 shows the measuring of a pipe with perpendicular measuring axis;

FIG. 11 shows the measuring of a pipe with angled measuring axis;

FIG. 12 shows a measuring device including three measuring axes arranged offset in the circumferential direction, C;

FIG. 13 shows the measuring of a corrugated pipe in multiple planes;

FIG. 14 shows the measuring with rotating measuring device;

FIG. 15 shows the measuring with moving measuring axis as autofocus; and

FIG. 16 shows the measuring with moving measuring axis as adjustable zoom.

DETAILED DESCRIPTION

Figures 1, 2, 3:
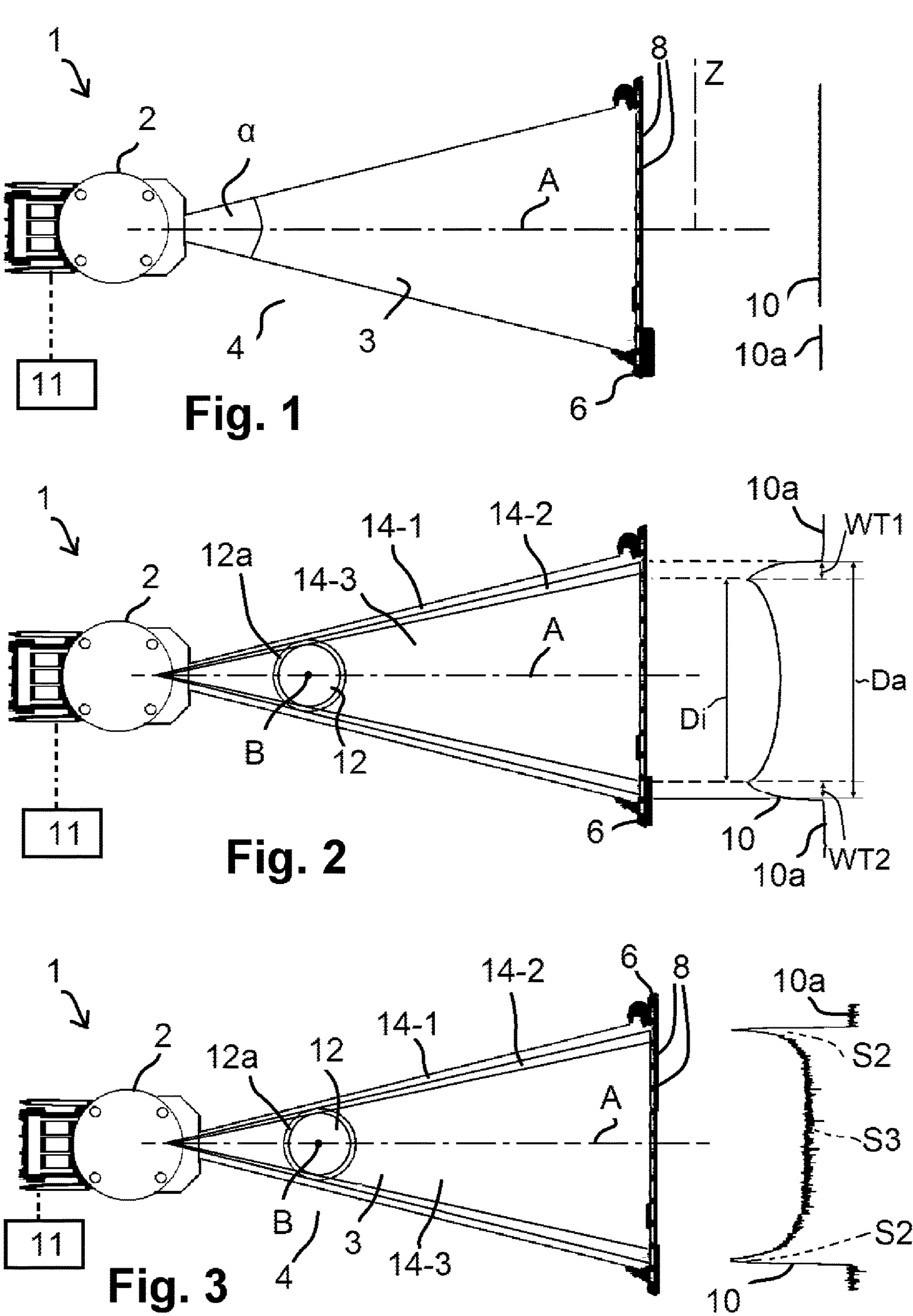
FIG. 1 shows an X-ray measuring device in an empty measurement.
FIG. 2 shows the X-ray measuring device when measuring a flawless pipe, with a reference transmission curve as an averaging across multiple measurements.
FIG. 3 shows a measurement with an exposure time of 1 ms, without averaging.

FIG. 1 shows the measuring principle of an X-ray measuring device 1, in this case formed with a measuring axis, thus comprising an X-ray source 2 which emits an X-ray beam 3 with an angle of radiation a along a measuring axis A through a measuring space 4 onto an X-ray detector 6. As shown here, the X-ray detector 6 may be planar or curved concavely. FIG. 1 shows a top view on the X-ray detector in the measuring plane with a widening of the X-ray beam 3 in an angle of radiation a (here, in relation to the measuring axis) in the measuring plane, so as to cover the measuring space 4 as widely as possible. The X-ray detector 6 is configured to include, e.g., three thousand measurement channels 8 which form a row in a measuring direction Z. In the direction of the transport axis B, which is perpendicular to the measuring axis A and measuring direction Z, the X-ray detector 6 may be configured, e.g., with only one measurement channel, e.g., 70 micrometer detector width, as will be explained below with reference to FIGS. 5, 6. The measuring channels 8 each put out an intensity signal which forms the transmission curve 10 in the measuring direction Z, thus representing the intensity I across the multiple measuring channels 8 or pixels respectively. The intensity I is attenuated depending on the measurement object covered in the measuring space 4, thus, in this case, a pipe 12. Firstly, in FIG. 1, a transmission curve 10 of a consistent signal in the case of an empty measuring space 4 is shown. In some embodiments, transport axis B may also be an axis of symmetry.

The evaluation happens, in particular, by means of an evaluator means 11 or, respectively, controller and evaluator means 11, which will be omitted in the Figures below for better clarity.

FIG. 2 shows the measuring of an ideal pipe 12 as measurement object, which is transported in the transport direction B through the measuring space 4 and the measuring axis A—in this case, perpendicular to B—and continuously measured. The ideal transmission curve 10 shown in FIG. 2 on the right-hand side results from measuring the ideal pipe 12 with an ideal detector, long exposure time and averaging across multiple measurements, e.g., with more than 10 ms exposure time and when averaging across 50 measurements. In the transmission curve 10 the absorption by the material of the pipe 12 can be seen in the usual way as an attenuation of the intensity, increasing from left to right in the Figures. Thus, the transmission curve 10 in the empty measurement of FIG. 1 initially only shows a zero-line 10*a*, i.e., consistent maximum intensity.

The material of the pipe 12 causes absorption and reduction of the intensity I leading to transmission curves 10 deviating from the zero-line 10*a*. Thus, according to FIGS. 2, 3, in the outermost angular ranges 14-1 of the X-ray beam 3, which travel past the pipe 12, the zero-line 10*a* still remains. Towards the inside, i.e., in the direction of the measuring axis A, this is followed by angular ranges 14-2 in which the pipe wall 12*a* is captured by the beams essentially parallel. Accordingly, here in the outer curve areas S2 the transmission curve exhibits its maximum absorption value because the pipe 12 in its outer regions exhibits the highest absorption. The middle angular range 14-3 of the X-rays 3 corresponds to a middle curve area S3; here the transmission curve drops towards the measuring axis B, i.e., the intensity increases because here the pipe wall 12*a* is captured more perpendicularly by the radiation. Thus, according to FIG. 2, the relevant geometric dimensions, i.e., the outer diameter Da, the inner diameter Di, and the two wall thicknesses WT1 and WT2 in the outer areas can be deduced from the transmission curve 10. The ideal transmission curve 10 of an ideal pipe according to FIG. 2 with long exposure times and averaging, however, cannot be attained in this way in a continuous measuring of a pipe 12 transported in the transport direction B; moreover, the X-ray detector will have a specific noise floor deviating from the ideal curve.

FIG. 3 shows the transmission curve 10 in a measurement with an exposure time of 1 ms and without averaging; accordingly, the transmission curve 10 looks very noisy. Thus, in particular, smaller deviation from the ideal transmission curve are unintelligible.

FIG. 4 shows the measurement of a pipe 12 exhibiting a material weakening 13, i.e., a dent or recess, on the outside and/or on the inside of its pipe wall 12*a*. The material weakening 13 may be, e.g., even a shrinkage cavity, i.e., an air pocket in the pipe wall 12*a*. In this case, the material weakening is present in the middle angular range 14-3. Under the same measuring parameters as in FIG. 3, i.e., with an exposure time of 1 ms and without averaging across multiple measurements, a mark 15*a* can be seen in the transmission curve 10, in this case by the lower attenuation in the transmission curve 10. By generating a difference of the current transmission curve 10 of FIG. 4 and the reference transmission curve of FIG. 3 the noise components are significantly reduced. Hereby, in particular, the intensity values of the individual measuring channels 8 or, respectively, pixels are subtracted from each other. In particular, the generation of an averaged transmission curve 10 as reference transmission curve, which is then subtracted from the current transmission curve 10 of FIG. 4, leads to a more precise detection of the material weakening 13.

Figure 7:
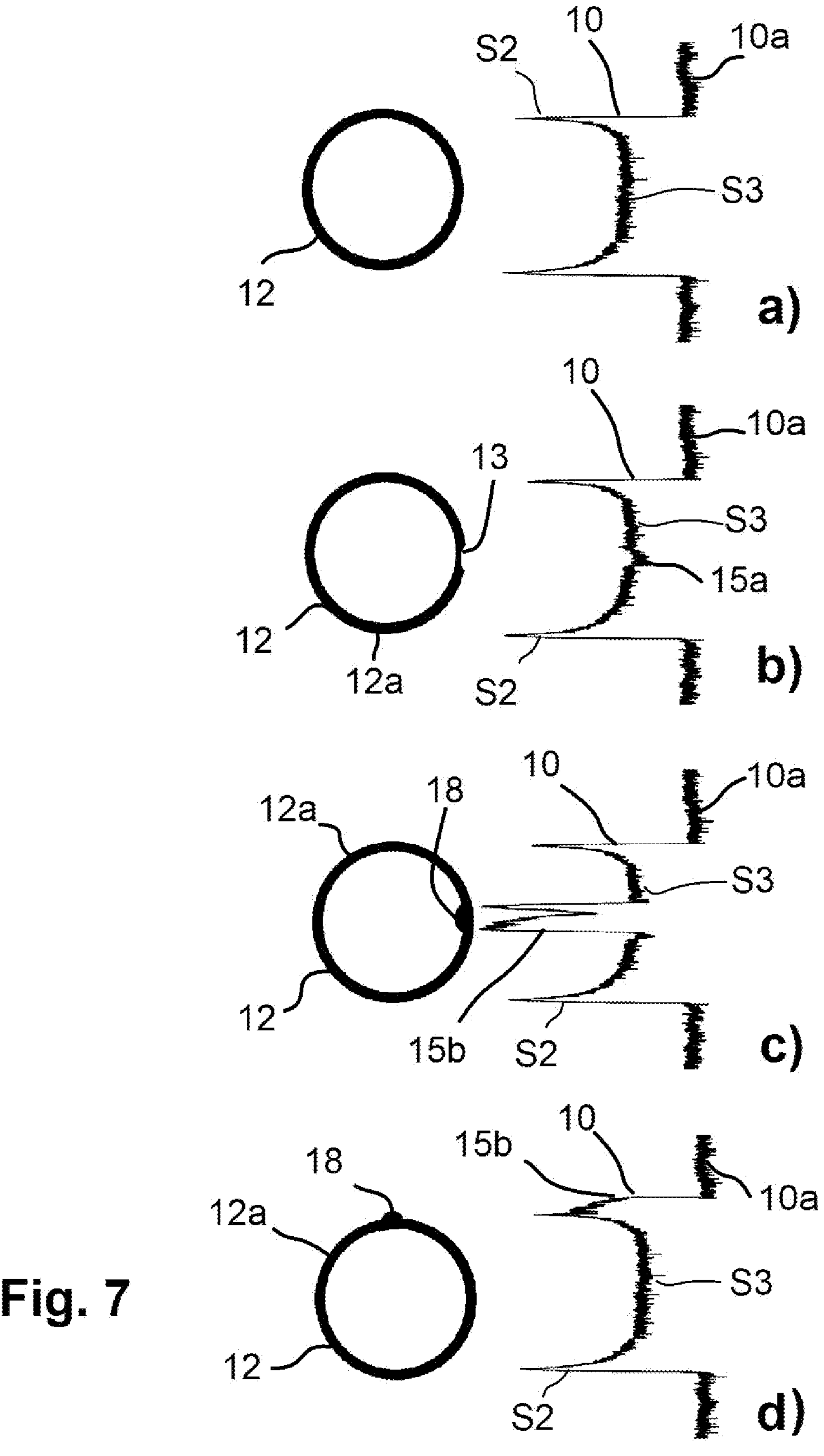

FIG. 7 shows transmission curves 10 with different pipes 12: According to diagram a) a transmission curve 10 with the afore-mentioned measuring parameters in a fault-free pipe 12 can be seen; according to diagram b) a material weakening 13 in the middle angular range 14-3 of the emission angle α, is formed, which can be recognized accordingly in the transmission curve 10 in the middle signal area S3 as mark 15*a*. Diagram c) shows a pipe 12 with a defect 18 as burn-off which may appear, in particular, upon extrusion and forms as a deposit of material, in particular, also of burnt material, one the interior surface of the pipe wall 12*a*. Accordingly, a mark 15*b* can be seen as intensity attenuation in the transmission curve 10 in the middle signal area S3. In Diagram d) of FIG. 7, the burn-off 18 is formed on the outer area of the pipe 12, i.e., the angular range 14-2 of the X-rays 3, and, thus, falls into the outer signal area S2 with the maximum absorption in the transmission curve 10; however, in principle, it may be resolved in the course of the subsequent difference generation of the individual measuring channels 8.

The FIGS. 4 through 6 show the capture of a defect in the various directions. In the measuring direction Z of FIG. 4, multiple measuring channels 8 or pixels respectively lie side by side, e.g., three thousand measuring channels. Thus, this is, e.g., an array made of 3000×1 measurement channels 8 or pixels respectively. FIG. 5 shows a top view on FIG. 3, i.e., the top view in the measuring direction Z and, therewith, perpendicular onto the transport direction B or, respectively, on the pipe axis. Thus, the X-ray beam 3 has the smaller aperture angle beta which is received in this case, e.g., by only one measurement channel 8 or one pixel respectively, with a signal width d8. Thus, this is an embodiment with a single detector row. In FIG. 5, on the pipe 12 this results in a starting width d3 of the X-ray beam 3 which, according to the divergent beam path, is smaller than the signal width d8.

According to the present disclosure, advantageously, a complete coverage can be carried out even of a defect 13, 18 extending across wider areas of the measurement object 12. The extension of the defect 13, 18 along the pipe axis B or, respectively, in the transport direction is shown in FIG. 6, where FIG. 6 is a top view of FIG. 4, with the defect 13. The longitudinal extension of the defect 13, 18 can be determined by comparing the temporally successive measurements. A clear signal results when, according to FIG. 6, the X-ray beam 3 with its starting width d3 in the region of the measurement object 12 lies completely inside the defect 13 because, in this case, there is a clear change of the measuring signal in relation to the previous reference measurement. Thus, for a continuous coverage of the defect 13, 18 in the transport direction B a relevant threshold extrusion velocity can be determined from the exposure time, e.g., 1 ms or 10 ms, and the starting width d3. In the case of, e.g., a starting width d3 of the X-ray beam 3 in the transport direction or, respectively, along the pipe axis B the result will be, e.g., a signal width d8 of d8=70 μm on the X-ray detector 6.

Therefore, in order for the fault, e.g., a material weakening 13, with a longitudinal extension in the direction of the transport direction B of 5 mm, to be fully captured, a starting width d3=30 μm of the X-ray beam 3 and an exposure time t=1 ms results in a critical velocity of 298.8 m/min. Accordingly, an exposure time t=10 ms will result in a critical velocity of 29.8 m/min, to a allow for a correspondingly precise examination of the fault.

FIG. 13 shows a corrugated pipe 112 as strand or, respectively, measurement object exhibiting waves 113 (crests, elevations) and valleys (sinks, troughs) 114. The corrugated pipe 112 may be configured with an additional inner pipe 111, as usually used, in particular, for routing fluids, or without an inner pipe, as used e.g., for laying cables. The corrugated pipe 112 shown here exhibits a continuous inner pipe 111. Thus, an exterior diameter Da, an interior diameter Di, as well as the heights of the edges V1, V2 should be measured on the corrugated pipe 112. Furthermore, the corrugated pipe 112 in FIG. 13 exhibits, by way of example, a first defect as burn-off 18, and a further defect, e.g., a rupture in the inner layer, as material weakening 13.

FIG. 13 shows measurements in four measuring planes:

- measuring plane A, representing a measurement at a regular wave 113,
- measuring plane B, representing a regular measurement in a sink 114,
- measuring plane C, representing a measurement in the region of a sink 114 with the material weakening 13, in this case a rupture in the inner layer, and
- measuring plane D, representing a measurement in the region of the wave 113 with both the material weakening 114 by the missing inner layer and the material burn-off 118 as inclusion.

Furthermore, FIG. 13 correspondingly depicts the transmission curves of the measuring planes E1 through E4. Hereby, each transmission curve 10 in turn shows outer areas as zero-lines 10*a* representing the areas without intensity attenuation alongside the corrugated pipe 112, i.e., according to FIGS. 1 through 4. In the planes E1 and E4, these are followed in the inwards direction by peaks 113*a* as absorption by the wave 113, i.e., the corrugated outer layer, then areas 113*b* with little absorption between the wave 113 and the inner pipe 111, thereupon the inner pipe 111 and in the middle a region of little absorption according to the angular range 14-3 of the FIGS. 1-3. In the diagram of plane E2, i.e., in the sink 114, lies the outer layer on the inner pipe 111 so that a joint peak is formed so that essentially the areas 10*a*, 111, and 14-3 appear.

In addition to the diagram of plane E2, in the plane E3 the material weakening 13 can be seen as defect 15*a* in the middle area 14-3. In addition to the diagram of plane E1, in diagram E4 in the middle area 14-3 the burn-off 18 is apparent in turn as intensity attenuation 15*b*, within which the rupture in the material layer, i.e., wider area material weakening 14, can be recognized as defect 15*a*.

Thus, defects 13, 18 can be recognized in the transmission curve 10 as defects 15*a*, 15*b* in all areas of the corrugated pipe 112, and in particular, in the case of different dimensions of the defects 13, 18, even overlapping defects can be differentiated.

FIG. 8 shows a measuring device in which multiple measuring axes A are arranged one after another in the transport direction B, e.g., successively and parallel to one another. Thus, compared to FIG. 5, 6, given an equal starting width b3, a defect 13, 18 can be captured entirely even at a higher extrusion velocity.

In FIG. 9, a wider X-ray beam 3 with a wider angle of emission β perpendicular to the measuring plane or, respectively, in the transport direction B, is used including multiple pixels or measurement channels 8 respectively in the transport direction B. According to FIG. 9, three measuring channels 10 in the transport direction B are provided, however, it even, e.g., up to 128 corresponding measuring channels 10 may even be arranged successively, i.e., e.g., as a 3,000×128 matrix. Thus, corresponding to the embodiment of FIG. 8, a defect 13, 18 may be detected completely in the transport direction B, which may be the same as the longitudinal direction, even at a higher extrusion velocity.

FIG. 12 shows an embodiment in which multiple measuring axes A are arranged offset from one another in the circumferential direction, C and not parallel to each other, i.e., arranged around the pipe 12 such that each X-ray source 2 cover the pipe 12 with its measuring axis A from another direction. The measuring axes A may lie in the same measuring plane or—in addition to the angular offset—also offset in the transport direction, i.e., in different or, respectively, successive measuring planes. Thus, upon transporting the pipe 12 in the transport direction B, this allows for projections from different directions so a 3D reconstruction of the fault 13, 18 and thereby a determination of the volume of the fault is carried out. This can be carried out by means of a trigonometric evaluation or, respectively, tomography, and/or comparison and allocation of the defect 13, 18 in the transmission curve 10.

According to FIG. 10, 11, in addition to or instead of the measuring axis A shown in FIG. 10 and extending perpendicular to the transport direction B or, respectively, longitudinal axis of the pipe 12, an angular measuring axis A according to FIG. 11 may be provided which, therefore, does not extend perpendicular to the transport direction B. The longer path through the pipe wall 12*a* results in a higher absorption in the transmission curve 10 so that an improved contrast is attained. Furthermore, the angular path also allows for a trigonometric determination, if, in addition, the perpendicular measuring axis A is provided, as in FIG. 10.

According further embodiments, a movable measuring axis A may be provided: According to FIG. 15, the measuring axis A is in the measuring plane, i.e., perpendicular to the transport axis B, so autofocusing is carried out to automatically center the X-ray beam 3 and the measuring axis A, as shows in FIG. 11. In this respect, an adjustment means 16 has been added in the Figures. Thus, in FIG. 11, upon determination of an absorption in the transmission curve 10 outside the middle area, an automatic adjustment can be carried out such that the measurement object 12 is captured in a middle area of the transmission curve 10. FIG. 16 shows an adjustable zoom, i.e., a longitudinal adjustment, D of the X-ray measuring device 1, or, respectively, of X-ray source 2 and X-ray detector 6, in the direction of the measuring axis A. Thus, the magnification can be adjusted and the area in the transmission curve 10 capturing the measurement object 12, i.e., between the areas of the zero-line 10*a*, can be enlarged. Hereby, in particular, an automatic zoom may be carried out, in which, therefore, a beneficial position of the X-ray source 2 is determined and adjusted by longitudinal adjustment in the direction of the measuring axis A, according to FIG. 12.

FIG. 14 shows the embodiment with a rotational or, respectively, revolutionary motion executed in the circumferential direction, C about the transport axis B. Because the pipe 12 is transported in the direction of the transport axis B this will result in a spiral or, respectively, helical path of the measuring axis A in relation to the circumference of the pipe 12. Thus, what is provided is a rotating system with a detector row oriented in the transport direction or, respectively, the direction of the transport axis B.

In all embodiments, it is therefore possible, upon evaluation of the measuring signals, i.e., the transmission curves 10 determined, to firstly capture and average multiple regular measurements, i.e., e.g., transmission curves 10 according to FIG. 3 as well as FIG. 7*a*) with a normal pipe 12 so that ideally a reference transmission curve according to FIG. 2—with specific deviations of the measuring channels 8—is determined which serves as reference measurement for subsequent evaluations, in particular, for a calculation of difference of the intensity values of the individual measuring channels 8. Hereby, in particular, machine learning or, respectively, automatic learning, e.g., even as AI or, respectively, artificial intelligence, and/or by means of auto-regression, may be carried out so that the evaluation will be continuously improved by fully automatic measuring. Hereby, it is possible, for one thing, upon detecting regular areas, to generate improved averaging for determining a reference of a proper measurement object 12, 112; it is further possible to carry out a more precise evaluation and classification of defects 13, 18 by means of continuous measurements; hereby, in particular, it is also possible to allow for an input by a user who carries out an input when a defect has been detected to characterize the defect.

X-ray measuring devices allow measuring of measurement objects of various materials, e.g., plastics, but also metal layers. The short wavelength of the X-rays generally allows for high resolutions. Thus, strands, e.g., pipes or corrugated pipes, can be transported continuously through a measuring space of an X-ray measuring device and measured directly after being extruded. The X-ray measuring devices usually comprise an X-ray source which emits divergent X-rays along its measuring axis through the measuring space towards an X-ray detector lying behind it which comprises one or more of the detector rows made of individual measurement channels or pixels respectively. Thus, the X-ray detector picks up a transmission curve which is determined by the absorption of the X-rays in the respective measurement object. Thus, thicker material regions absorb more strongly and allow for a better evaluation.

In X-ray measuring pipes, usually, wall thicknesses in the outer angular ranges of the angle of coverage are evaluated, because here the pipe wall is traversed by the X-rays essentially in parallel thereby creating high contrast, while the contrast is smaller in the middle.

Exact determinations of defects are usually impossible because, among other things, the noise or measurement noise respectively at pre-determined exposure times will be considerable. The noise can be reduced by longer exposure times; accordingly, however, a continuously transported measurement object can then be picked up generally only at low extrusion velocities so that the extrusion speed will be limited. Furthermore, the measuring of complex measurement objects, such as, e.g., corrugated pipes, is problematic.

A comparative device and a comparative method may be used for contactless, non-destructive measuring of pipe-shaped products and detecting defects. Hereby, radioactive radiation from cobalt and cesium is used to penetrate the pipe-shaped product from multiple radiation sources, whereby the measured results are compared to an ideal curve.

A comparative method for determining the geometric parameters of an object by means of radiography, whereby the object is penetrated by radiation may be used. Hereby, a radiographic image of the object is generated and multiple parallel sectional images are determined from the radiographic image.

A comparative method for detecting anomalies by means of non-destructive image capturing may be used. Hereby, an inspection test image of the object to be scanned and multiple reference images are used, whereby characteristics are determined in an anomaly detection model based on a statistic analysis.

One object of the present disclosure is to create an X-ray measuring method and an X-ray measuring device allowing for a secure measuring and detection of defects.

This task is solved by an X-ray measuring method and an X-ray measuring device according to the independent claims. The sub-claims describe preferred further developments.

The X-ray measuring device according to the present disclosure is provided, in particular, for carrying out the method according to the present disclosure.

Thus, according to the present disclosure, upon conveying or, respectively transporting the strand through the measuring space of an X-ray measuring device, transmission curves are collected continuously allowing for the resolution of the measurement in a measuring direction, i.e., the longitudinal length of the detector row which runs perpendicular to the transport direction and to the measuring axis. Hereby, it is provided to compare the transmission curves to determine defects from such comparison. To that end, at least one transmission curve is recorded and stored as reference transmission curve. Advantageously, multiple transmission curves are picked up by measurements of the strand at different point in time and thereby at different locations of the pipe, and from these a averaged value is formed which serves as reference transmission curve. Thus, by comparing a current transmission curve to the reference transmission curve, faults can be detected and, in particular, even their shape or topology respectively and/or volume can be determined.

Thus, it is possible to continuously measure the strand as measurement object, whereby the currently recorded transmission curves can be continuously compared and checked. Thus, a fault or, respectively, defect in the strand can be recognized and checked directly and immediately to make adjustment to production parameters.

Furthermore, by virtue of the comparison it is possible to also measure the strand in its middle region which is usually not evaluated in comparative measurements due to the low absorption.

By carrying out an averaging across multiple measurements it is possible to generate a transmission curve with high accuracy in which noise is reduced. Thus, a comparison of a current transmission curve with the reference transmission curve is made possible. Hereby, in particular, also specific values of noise of the detector may be recognized and stored in the reference curve so that the current noise of a current transmission curve is not falsely detected as defect. Thus, compared to a theoretic ideal transmission curve the reference transmission curve obtained according to the present disclosure by averaging is advantageous because it takes into consideration the specific noise due to specific characteristics of the X-ray source and the X-ray detector.

Thus, regions with low transmission, i.e., higher absorption, can be recognized as thickenings of material, in the case of extruded pipes, e.g., as burn-off. Correspondingly regions with higher transmission, i.e., lower absorption, can be recognized as material weakening, e.g., shrinkage cavities or material ruptures in the inner layer or outer layer.

The evaluation of the transmission curve first happens in the measuring direction, i.e., the longitudinal extension of the detector row which runs perpendicular to the optical axis and, usually, also perpendicular to the transport direction. Hereby, changes in regions can be detected in successive channels or, respectively, pixels along the measuring direction. Furthermore, successive measurements of the transported strand allow for detecting a longitudinal extension of the defect in the transport direction.

Further measures can improve the accuracy of the determination and classification even further. Arranging multiple measuring axes in the circumferential direction, C around the measuring space allows for a precise localization of a defect in the strand; this allows, e.g., a determination as to whether the defect is present in the material wall of a pipe, on the inner layer or outer layer. Thus, a localization can be carried out, e.g., by trigonometric calculation. Thus, in particular, even faults on the inner layer or shrinkage cavities localized that cannot be recognized from outside.

Furthermore, even overlapping defects can be detected, e.g., burn-off in the region of a material weakening, e.g., a rupture in a layer. Faults of this kind may appear, e.g., when during extrusion the material stays at the hot extruder head for too long and forms a burn-off so that, for one thing, a material weakening will appear in the layer and, for another, the burnt material appears as a local thickening. Defects of this kind may otherwise, when viewing a single transmission curve, potentially be not securely detected because the transmission in total is not influenced to a relevant extent. By virtue of the comparison with the more exact reference transmission curve and optionally the three-dimensional or, respectively, topological determination, even such more complex faults can be securely recognized and quantified.

According to a preferred embodiment, the reference transmission curve may be continuously adjusted by including current transmission curves, whereby, in particular, an adaptive comparison of the current transmission curve with the previous transmission curves may be carried out, e.g., taking into consideration changes of the intensities across a longer period of time. Hereby, in particular, migration of the focus point, temperature fluctuations at the detector may be detected, further also influences by the outside temperature, e.g., changes in the outside temperature, also influences by cooling. Furthermore, in particular, wear of the detectors by burning-in of the X-rays may be taken into consideration; such burning-in processes generally limit the lifetime of X-ray detectors. Recognizing the burning-in as long-term drift allows it to be taken into consideration so that the lifetime can be significantly extended.

Thus, it may also be determined, in particular, whether a fault already constitutes an unallowable defect or is still in the realm of admissible tolerance.

According to a further embodiment, the X-ray source and/or the X-ray detector may be adjusted. Hereby, according to one embodiment, a common adjustment along the measuring axis is provided, i.e., towards the strand and away from the strand, so as to attain centering of the measurement object. Furthermore, a relative adjustment of the X-ray source in relation to the X-ray detector, e.g., an adjustment of the X-ray source with a fixe X-ray detector is possible to create a focusing, e.g., even as autofocus, so that, e.g., the region of the strand covered in the transmission curve is widened, thereby improving the resolution.

According to a further embodiment, the measuring device or, respectively, X-ray source and X-ray detector may jointly rotate or reverse around the measuring space or, respectively, the measurement object so as to thereby capture the measurement object from different circumferential directions and, e.g., improve the localization of a fault. Thus, faults may be detected in various areas of the transmission curve making it easier to identify them.

The X-ray detector may be configured as a detector row made up of, e.g., three thousand successive measurement channels or pixels respectively; furthermore, the detector may also be configured as a multi-dimensional matrix, e.g., including two or more detector rows. In the alternative and in addition hereto, even multiple measuring axes each made up of an X-ray source and an X-ray detector may be provided one behind another in the transport direction which, therefore, allow for a measuring of the measurement object by means of successive measuring planes in the transport direction. Beside a perpendicular orientation of the measuring axis in relation to the transport direction, angled arrangements are possible, too, to increase absorption and therewith contrast.

The measuring channels or pixels respectively may be configured as hardware, e.g., as CMOS sensors and/or CCD sensors and/or scintillation counters. Hereby, in particular, they may also be configured as time to delay (TDI) CCD sensors, wherein the measurement object or the strand respectively may be guided along the detector, and, preferably, a synchronization of the image capture with the transport velocity may be carried out.

The X-ray detector may be configured, in particular, planar or concavely curved. Hereby, advantageously, the planar measuring plane of the X-ray detector lies perpendicular to the measuring axis of the X-ray source. In the embodiment as a planar X-ray detector, in particular, no exact positioning of the pipe is required, while in the case of concave embodiments, generally, a positioning of the pipe in the focal point or, respectively, center point of the concave embodiment is provided. Thus, even a pipe that is placed not exactly at the intended position will still be well covered.

Thus, advantageously in the method according to the present disclosure, too, a planar X-ray detector is used so that, in particular, the strand must no longer be placed so exactly, and this is, in particular, of advantage also with extrusion products in which the extruded strand usually bends.

In the method according to the present disclosure, advantageously, it is possible to determine as faults one or more of the following characteristics in the current transmission curve by means of a comparison with the reference transmission curve:

a weakening of the material, e.g., imperfection, rupture in a layer, defect or shrinkage cavity, as contiguous areas of measuring channels with a lower intensity, and/or a deposit of material, in particular, burn-off, as contiguous areas of measuring channels with a higher intensity. Hereby, in particular, even overlapping faults as an area can be determined in which both weakening of material and material deposits are present.

According to a preferred embodiment it is provided that upon determining the position of the fault it is also determined whether the fault is present in: a wall of the strand, e.g., a pipe wall, on an exterior surface, e.g., an exterior region of a pipe wall, in the inside of the strand, e.g., on an interior wall of the strand, in particular, by measuring in multiple measuring axes.

According to a preferred embodiment it is provided in the method that the one or more X-ray sources are adjusted during the transport of the strand in the transport direction, and/or in the circumferential direction, C, e.g., rotating and/or reversing, around the axis of transport and/or an axis of symmetry of the measuring space, and/or in the direction of their measuring axis.

Hereby, advantageously, it is provided that upon adjustment of the X-ray source in the direction of the measuring axis a focusing, e.g., autofocusing is carried out, to change or adapt the area of the strand covered by the transmission curve.

According to an advantageous embodiment it is provided in the X-ray measuring device according to the present disclosure that it comprises an adjustment means for adjusting the X-ray source and the X-ray detector along a measuring direction.

The X-ray voltage of the X-ray source may lie, in particular, in a range between 15 and 80 KV, preferably 15 and 70 KV, in particular, with current in a range between 0.1 mA and 2 mA.

The present disclosure relates to an X-ray measuring method and an X-ray measuring device for measuring a strand (12), including the following steps:

providing an X-ray measuring device (1) which comprises an X-ray source (2), an X-ray detector (6) and a measuring space (4) formed in-between these, emitting X-rays (3) from the X-ray source (2) through the measuring space (4) and the strand (12) in a measuring plane along a measuring axis (A) and detecting the X-rays passing through the strand (12) by the X-ray detector (6), which comprises at least one detector row of measurement channels, generating a transmission curve (10) which expresses detected values of the intensity of the measuring channels, storing the transmission curve as at least one reference transmission curve, carrying out at least one further, current X-ray measurement by the X-ray source and the X-ray detector and generating a current transmission curve, comparing the current transmission curve with at least the reference transmission curve, where all measuring channels (8) are compared, evaluating the comparison and determining as to whether a fault is present in the strand (12).

The invention claimed is:

1. An X-ray measuring method for measuring a strand, comprising the following steps:

providing an X-ray measuring device, which comprises an X-ray source, an X-ray detector and a measuring space formed in-between them;

emitting X-rays from the X-ray source through the measuring space and the strand in a measuring plane along a measuring axis and detecting the X-rays passing through the strand by means of the X-ray detector, which comprises at least one detector row of measurement channels;

generating a transmission curve as a measuring signal by means of the X-ray detector, wherein the transmission curve expresses detected values of the intensity of the measurement channels;

storing the transmission curve as at least one reference transmission curve;

carrying out at least one further, current X-ray measurement by means of the X-ray source and the X-ray detector, and generating a current transmission curve;

comparing the current transmission curve with at least the reference transmission curve, whereby all measurement channels are compared; and evaluating the comparison and determining whether a fault is present in the strand;

continuously changing the reference transmission curve by using the current transmission curve; and performing an adaptive comparison of the current transmission curve with at least one previous transmission curve.

2. The X-ray measuring method of claim 1, further comprising the step of transporting the strand through the measuring space in a transport direction and hereby continuously measured.

3. The X-ray measuring method of claim 1, further comprising the step of generating a plurality of reference measurements of the strand and generating an averaged reference transmission curve.

4. The X-ray measuring method of claim 3, wherein the plurality of reference measurements of the strand are made at different points in time.

5. The X-ray measuring method of claim 1, wherein the X-rays emitted by the X-ray source form a divergent bundle of rays around the measuring axis in the measuring plane, the transmission curves each having outer curve regions with high absorption, wherein walls of the strand positioned outside relative to the measuring axis are configured to be passed through the X-rays, and a middle curve region with less absorption, wherein both the outer curve regions and the middle curve region of the current transmission curve and the reference transmission curve are compared with one another.

6. The X-ray measuring method of claim 1, wherein the step of comparing the current transmission curve with the reference transmission curve includes one or more of the following comparison steps:

comparing the intensities of the individual measurement channels of the current transmission curve with corresponding measurement channels of the reference transmission curve;

calculating the difference between the intensities of the individual measurement channels of the current transmission curve with the corresponding measurement channels of the reference transmission curve;

comparing images of the current transmission curve with the reference transmission curve;

comparing the sum of all intensities of all measurement channels of the current transmission curve with the sum of all intensities of the measurement channels of the reference transmission curve;

comparing the current transmission curve with the reference transmission curve using auto-regression;

comparing the current transmission curve with the reference transmission curve using a self-learning algorithm;

comparing the current transmission curve with the reference transmission curve using a self-learning algorithm for classifying faults;

comparing the current transmission curve with the reference transmission curve using an artificial intelligence;

comparing the current transmission curve with the reference transmission curve using machine learning;

comparing the current transmission curve with the reference transmission curve using deep learning; and comparing the current transmission curve with the reference transmission curve by classifying at least one fault.

7. The X-ray measuring method of claim 1, wherein during the step of comparing the current transmission curve with the reference transmission curve, at least one characteristic of the current transmission curve is determined as a fault, the characteristic being at least one of:

a weakened material;

an imperfection;

a rupture in a layer;

a defect;

a shrinkage cavity;

a defect shown as contiguous areas or neighboring measurement channels with a low intensity;

a material deposit shown as a contiguous area of measurement channels with a higher intensity; and a burn-off shown as a contiguous area of measurement channels with a higher intensity.

8. The X-ray measuring method of claim 7, including the step of classifying areas in which both weakened material and material deposit is present as overlapping faults.

9. The X-ray measuring method of claim 1, wherein when determining whether a fault is present in the strand, determining a position of the fault, and determining whether the position is located in one or more areas comprising:

a wall of the strand;

a pipe wall;

on an exterior surface;

in an exterior region of a pipe wall;

on an inside of the strand; and on an exterior wall of the strand.

10. The X-ray measuring method of claim 9, wherein determining a fault or a position of the fault is carried out by measuring in multiple measuring axes.

11. The X-ray measuring method of 10, wherein the multiple measuring axes include one or more of the following axes:

multiple static measuring axes arranged sequentially in the transport direction or an adjustment direction;

multiple static measuring axes arranged circumferentially around a transport axis;

multiple static measuring axes arranged circumferentially around an axis of symmetry of the measuring space, multiple measuring axes inclined at different angles relative to the transport axis; and multiple measuring axes inclined at different angles relative to the transport axis for enhancing contrast.

12. The X-ray measuring method of claim 1, including the step of determining a three-dimensional extension of the fault using one or more of the following determining steps:

determining a width of the fault in the measuring plane from adjacent measurement channels of the current transmission curve; and determining a longitudinal extension of the fault in an adjustment direction or a transport direction from transmission curves of successive measurements of the strand.

13. The X-ray measuring method of claim 12, wherein the step of determining the three-dimensional extension of the fault comprises determining one or more characteristics of the group of characteristics of the fault including: a topology of the fault, a shape of the fault, and a volume of the fault.

14. The X-ray measuring method of claim 12, wherein when determining whether a fault is present in the strand, using one or more of the following characteristics:

a number of measurements, in a longitudinal direction, per unit of time;

an exposure time;

a transport velocity in the transport direction;

a relative width of the fault in relation to an overall width of the transmission curve of the strand, a geometry of a projection from the X-ray source to the X-ray detector.

15. The X-ray measuring method of claim 1, further comprising the step of transporting the strand and adjusting one or more X-ray sources while transporting the strand, wherein the one or more X-ray sources is adjusted in one or more of the following directions:

a transport direction;

circumferentially;

rotating circumferentially around a transport axis;

reversing circumferentially around the transport axis; and in the direction of the measuring axis of a respective X-ray source.

16. The X-ray measuring method of claim 15, wherein when adjusting the one or more X-ray sources in the direction of the measuring axis, focusing the X-rays to change or adapt a region of the strand covered by the transmission curve.

17. The X-ray measuring method of claim 1, wherein when comparing the current transmission curve with the reference transmission curve, the method further comprises the step of performing a position allocation or trigonometric determination.

18. The X-ray measuring method of claim 1, wherein the step of performing the adaptive comparison of the current transmission curve with the at least one previous transmission curve is performed by using long-term changes of the intensities over a period of time.

19. An X-ray measuring method for measuring a strand, comprising the following steps:

providing an X-ray measuring device, which comprises an X-ray source, an X-ray detector and a measuring space formed in-between them;

emitting X-rays from the X-ray source through the measuring space and the strand in a measuring plane along a measuring axis and detecting the X-rays passing through the strand by means of the X-ray detector, which comprises at least one detector row of measurement channels;

generating a transmission curve as a measuring signal by means of the X-ray detector, wherein the transmission curve expresses detected values of the intensity of the measurement channels;

storing the transmission curve as at least one reference transmission curve;

carrying out at least one further, current X-ray measurement by means of the X-ray source and the X-ray detector, and generating a current transmission curve;

comparing the current transmission curve with at least the reference transmission curve, whereby all measurement channels are compared;

evaluating the comparison and determining whether a fault is present in the strand;

wherein the strand is a corrugated pipe measuring, both in waves of the corrugated pipe and in valleys of the corrugated pipe, and performing a comparison with a reference transmission curve;

determining characteristics at different areas or in different measuring planes of the corrugated pipe;

determining one or more of the following characteristics from the current transmission curve:

an inner pipe of the corrugated pipe as an area of lower intensity;

an inner layer of the corrugated pipe as an area of lower intensity;

waves and valleys, wherein the waves are recognized as material regions spaced apart towards the outside from the inner pipe or the inner layer, wherein defects in both the valleys and the waves are recognized as material weakening or material increase; and.

20. An X-ray measuring device, comprising:

at least one X-ray source defining a measuring axis and configured to emit X-rays along the measuring axis;

an X-ray detector;

a measuring space formed between the X-ray source and the X-ray detector and configured to receive a strand transported in a transport direction;

an evaluation unit including a memory and configured to:

receive transmission curves detected by the X-ray detector and to store the transmission curves as reference transmission curves directly or after processing in the memory;

perform at least one X-ray measurement using the at least one X-ray source and the X-ray detector and generate a current transmission curve;

compare the current transmission curve of the X-ray detector with the reference transmission curves;

continuously store the current transmission curve as a reference emission curve in the memory;

compare the transmission curves across multiple measurement channels; and evaluate the comparison to determine whether a fault is present in the strand.

21. The X-ray measuring device of claim 20, comprising multiple static measuring axes each including an X-ray source and an X-ray detector, respectively;

wherein the multiple static measuring axes are offset from one another along at least one of the following directions:

along an axis of symmetry, in the transport direction, circumferentially around the measuring space, in a circumferential direction concentrically aligned with the axis of symmetry, in an angle of inclination against the axis of symmetry.

22. The X-ray measuring device of claim 20, comprising an adjustment means for adjusting or focusing a position of the X-ray source in the direction of the measuring axis.

23. The X-ray measuring device of claim 21, comprising an adjustment means for adjusting the X-ray source and the X-ray detector along a measuring direction.

24. The X-ray measuring device of claim 20, comprising an adjustment means for rotating or reversing the X-ray source and the X-ray detector about a transport axis.

25. The X-ray measuring device of claim 20, wherein the X-ray detector comprises:

one or more detector rows of measurement channels adjacent along a measuring direction; and each detector row comprising multiple measuring channels.

26. The X-ray measuring device of claim 25, wherein the multiple measuring channels comprise one or more of the following characteristics:

at least three thousand measuring channels;

a 3200×1 matrix of measuring channels;

a 3200×2 matrix of measuring channels; and a 3000×128 matrix of measuring channels.

27. The X-ray measuring device of claim 20, wherein the measurement channels are configured as sensors of the group comprising:

CMOS sensors;

CCD sensors;

time to delay CCD sensors; and scintillation counters.

28. The X-ray measuring device of claim 20, wherein an X-ray voltage of the X-ray source lies in the range between 15 and 70 KV, with currents in the range between 0.1 mA and 2 mA.

29. The X-ray measuring device of claim 20, wherein the X-ray detector is configured to be planar or with a planar measuring plane oriented perpendicular to the measuring axis of the at least one X-ray source.

* * * * *